(12) United States Patent
Kanjo et al.

(10) Patent No.: US 6,394,233 B1
(45) Date of Patent: May 28, 2002

(54) APPARATUS FOR OPERATING A VERTICAL WHEEL HAND BRAKE

(75) Inventors: Wajih Kanjo, Lockport, IL (US); Michael E. Ring, Crown Point, IN (US); Scott Natschke, Kankakee, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/904,948

(22) Filed: Jul. 13, 2001

(51) Int. Cl.[7] ............................................. F16D 65/14
(52) U.S. Cl. .................. 188/1.11 R; 188/107; 188/216; 188/33; 74/505
(58) Field of Search ............................ 188/107, 1.11 R, 188/1.11 E, 33, 105, 216, 153 R; 74/505, 504, 523, 411.5, 494, 495, 479.01–490.15, 506, 528; 116/58 A, 28 R, 43, 31, 200; 303/2, 13, 14

(56) References Cited

U.S. PATENT DOCUMENTS

| 4,296,707 A | * | 10/1981 | Kennedy ............... 188/1.11 R |
| 4,368,648 A | | 1/1983 | Housman et al. |
| 6,006,868 A | * | 12/1999 | Klink .................... 188/1.11 R |
| 6,170,619 B1 | * | 1/2001 | Sheriff et al. ............... 188/107 |
| 6,237,722 B1 | * | 5/2001 | Hammond et al. .... 188/1.11 R |
| 6,325,465 B1 | * | 12/2001 | Sommerfeld et al. ....... 188/107 |

* cited by examiner

Primary Examiner—Douglas C. Butler
(74) Attorney, Agent, or Firm—James Ray & Associates (57) ABSTRACT

An apparatus for operation a railway car vertical wheel hand brake. A hand brake wheel has a hub fixed on an operating shaft. The operating shaft is rotatably mounted on the hand brake. The hand brake wheel further has a reaction member. A brake release mechanism is fixed on a brake release shaft that is rotatably mounted on the hand brake. The reaction member is engageable with the brake release mechanism when the hand brake wheel is rotated, whereby the position of the brake release mechanism will provide a visual indicator of the brake status.

20 Claims, 5 Drawing Sheets

APPARATUS FOR OPERATING A VERTICAL WHEEL HAND BRAKE

FIELD OF THE INVENTION

The present invention relates, in general, to a vertical wheel hand brake, and more particularly, to an apparatus for operating a vertical wheel hand brake.

BACKGROUND OF THE INVENTION

Prior to the present invention, a railcar vertical hand brake includes a brake release mechanism that provides quick release of the brakes to permit free rotation of the winding gear. When a force is exerted on the release lever to move the attached brake release shaft, the main gear wheel is released, releasing the tension on the brake chain, which in turn releases the brake. Removing the force on the release lever re-engages the main gear wheel. However, the brake may not be fully released before the force is removed from the release lever. This condition will usually not be apparent to the operator. As the railcar negotiates a curve in the track, the truck rotates and can exert a pulling force on the brake chain. This action can apply the brakes to the truck while the train is in motion, resulting in friction and premature wear between the brake shoes and the wheels, and the wheels and the rail.

Furthermore, a railcar vertical wheel hand brake is located on an end of the railcar. When the railcars are coupled together, the operator has to walk between two cars to apply and release the brakes. This practice not only poses a potential danger to the operator, but also is inefficient.

An example of this type hand brake is taught in U.S. Pat. No. 4,368,648. The teachings of this reference are incorporated herein by reference thereto.

SUMMARY OF THE INVENTION

In a first aspect, the present invention provides an apparatus for operating a railway car vertical hand brake. The apparatus comprises a hand brake wheel having a hub fixed on an operating shaft rotatably mounted on the hand brake. The hand brake wheel further has a reaction member. A brake release mechanism is fixed on a brake release shaft which is rotatably mounted on the hand brake. The reaction member is engageable with the brake release mechanism when the hand brake is rotated. The position of the brake release mechanism will provide a visual indicator of the brake status.

In a further aspect, the present invention provides an apparatus for remotely operating a railcar vertical hand brake a predetermined distance from the railcar hand brake. The apparatus comprises a hand brake wheel located a predetermined distance from the hand brake. The hand brake wheel has a hub fixed on a first shaft, and the first shaft is engageable with an operating shaft rotatably mounted on the hand brake of the railcar. The hand brake wheel also has a reaction member. An activation means is fixed on a second shaft. The second shaft is rotatably mounted a predetermined distance from the first shaft. The activation means is engageable with the reaction member when the hand brake wheel is rotated, rotating the second shaft in an opposing direction to the rotation of the hand brake wheel. The second shaft is engageable with a brake release shaft rotatably mounted on the hand brake. A brake release mechanism is fixed on a third shaft, which is rotatably mounted a predetermined distance from the first shaft. The third shaft is articulately connected to the second shaft to rotate the third shaft in conjunction with the second shaft when the hand brake wheel is rotated. The hand brake can be remotely operated, and the brake status can be determined from a predetermined location on a railway car when the first shaft is connected to the operating shaft of the hand brake.

In still a further aspect, the present invention provides an apparatus for remotely operating a railcar vertical hand brake a predetermined distance from the railcar hand brake. The apparatus comprises a first hand brake wheel located a predetermined distance from the hand brake. The first hand brake wheel has a hub fixed on a first shaft. The first shaft is engageable with a first operating shaft mounted on a first side of the hand brake. The first hand brake wheel also has a reaction member. An activation means is fixed on a second shaft, and the second shaft is rotatably mounted a predetermined distance from the first shaft. The activation means is engageable with the reaction member when the first hand brake wheel is rotated, rotating the second shaft in an opposing direction to the rotation of the first hand brake wheel. The second shaft is engageable with a brake release shaft rotatably mounted on the hand brake. A first brake release mechanism is fixed on a third shaft, which is rotatably mounted a predetermined distance from the first shaft. The third shaft is articulately connected to the second shaft. A second hand brake wheel is substantially opposed to the first hand brake wheel, and is located a predetermined distance from the hand brake. The second hand brake wheel has a hub fixed on a fourth shaft, which is engageable with a second operating shaft rotatably mounted on a second side of the hand brake. A second brake release mechanism is fixed on a fifth shaft which is rotatably mounted a predetermined distance from the fourth shaft. A sixth shaft is rotatably mounted and substantially opposed to the third shaft of the first brake release mechanism. An elongated member of a predetermined length and shape connects the sixth shaft to the third shaft. The fifth shaft is articulately connected to the sixth shaft, whereby the second, third, fifth, and sixth shafts will rotate in conjunction when at least one of the first hand brake wheel and the second hand brake wheel is rotated. The railcar hand brake can be remotely operated from opposing sides of the railcar, and the brake status can be determined, when the first shaft is connected to the first operating shaft, and the fourth shaft is connected to the second operating shaft of the hand brake.

In still a further aspect, the present invention provides an improvement in combination with a railcar vertical hand brake having at least one operating shaft and release mechanism, which is mounted in a predetermined position on a the railcar. The improvement comprises a hand brake wheel having a hub fixed on a first shaft. The hand brake wheel is mounted a predetermined distance from the hand brake, and the first shaft is connected to the operating shaft which is rotatably mounted a predetermined distance from the first shaft. The brake wheel also has a reaction member. An activation means is fixed on a second shaft, and the second shaft is rotatably mounted a predetermined distance from the first shaft. The activation means is engageable with the reaction member when the hand brake wheel is rotated, which rotates the second shaft in an opposing direction to the rotation of the hand brake. The second shaft is connected to a brake release shaft rotatably mounted on the hand brake. A brake release mechanism is fixed on a third shaft, which is rotatably mounted a predetermined distance from the first shaft. The third shaft is articulately connected to the second shaft to rotate the third shaft in conjunction with the second shaft when the hand brake wheel is rotated. The hand brake wheel can be remotely operated, and the brake status determined, from a predetermined location on the railcar.

In still a further aspect, the present invention provides an improvement in combination with a railcar vertical hand brake having a first operating shaft rotatably mounted on a first side of the hand brake, a second operating shaft rotatably mounted on a second side of the hand brake, and a brake release mechanism, which is mounted in a predetermined position on a the railcar. The improvement comprises a first hand brake wheel located a predetermined distance from the hand brake. The first hand brake wheel has a hub fixed on a first shaft. The first shaft is connected to the first operating shaft mounted on a first side of the hand brake. The first hand brake wheel also has a reaction member. An activation means is fixed on a second shaft, and the second shaft is rotatably mounted a predetermined distance from the first shaft. The activation means is engageable with the reaction member when the first hand brake wheel is rotated, rotating the second shaft in an opposing direction to the rotation of the first hand brake wheel. The second shaft is connected to a brake release shaft rotatably mounted on the hand brake. A first brake release mechanism is fixed on a third shaft, which is rotatably mounted a predetermined distance from the first shaft. The third shaft is articulately connected to the second shaft. A second hand brake wheel is substantially opposed to the first hand brake wheel, and is located a predetermined distance from the hand brake. The second hand brake wheel has a hub fixed on a fourth shaft, which is engageable with the second operating shaft. A second brake release mechanism is fixed on a fifth shaft which is rotatably mounted a predetermined distance from the fourth shaft. A sixth shaft is rotatably mounted and substantially opposed to the third shaft of the first brake release mechanism. An elongated member of a predetermined length and shape connects the sixth shaft to the third shaft. The fifth shaft is articulately connected to the sixth shaft. The second, third, fifth, and sixth shafts will rotate substantially in conjunction when at least one of the first hand brake wheel and the second hand brake wheel is rotated. The railcar hand brake can be remotely operated, and the brake status determined, from opposing sides of the railcar.

OBJECTS OF THE INVENTION

It is therefore a primary object of the present invention to provide an apparatus for operating a railcar vertical wheel hand brake.

Another object of the present invention is to provide an apparatus for operating a railcar vertical wheel hand brake that will provide a definitive visual indicator to the operator that the brakes are in the applied or released mode.

Another object of the present invention is to provide an apparatus for remotely operating a railcar vertical wheel hand brake a predetermined distance from the railcar to increase operator safety.

Another object of the present invention is to provide an apparatus for remotely operating a railcar vertical wheel hand brake a predetermined distance from the railcar to increase operator efficiency.

Another object of the present invention is to provide an apparatus for remotely operating a railcar vertical wheel hand brake a predetermined distance from the railcar to reduce inadvertent brake applications by maintaining the brake release mechanism in the release position until brake application is desired.

Still another object of the present invention is to provide an apparatus for remotely operating a railcar vertical wheel hand brake a predetermined distance from the railcar that will provide a definitive visual indicator to the operator that the brakes are in the applied or released mode.

In addition to the various objects of the invention that have been described above, various other objects and advantages of the invention will become more readily apparent to those persons skilled in the relevant art from the following more detailed description of the invention, particularly, when such description is taken in conjunction with the attached drawing figures and the appended claims.

BRIEF DESCRIPTION OF A PRESENTLY

PREFERRED AND VARIOUS ALTERNATIVE

EMBODIMENTS OF THE PRESENT INVENTION

Prior to proceeding to a more detailed description of the invention, it should be noted that identical components having identical functions have been designated with identical reference numerals for the sake of clarity.

Figure 1:
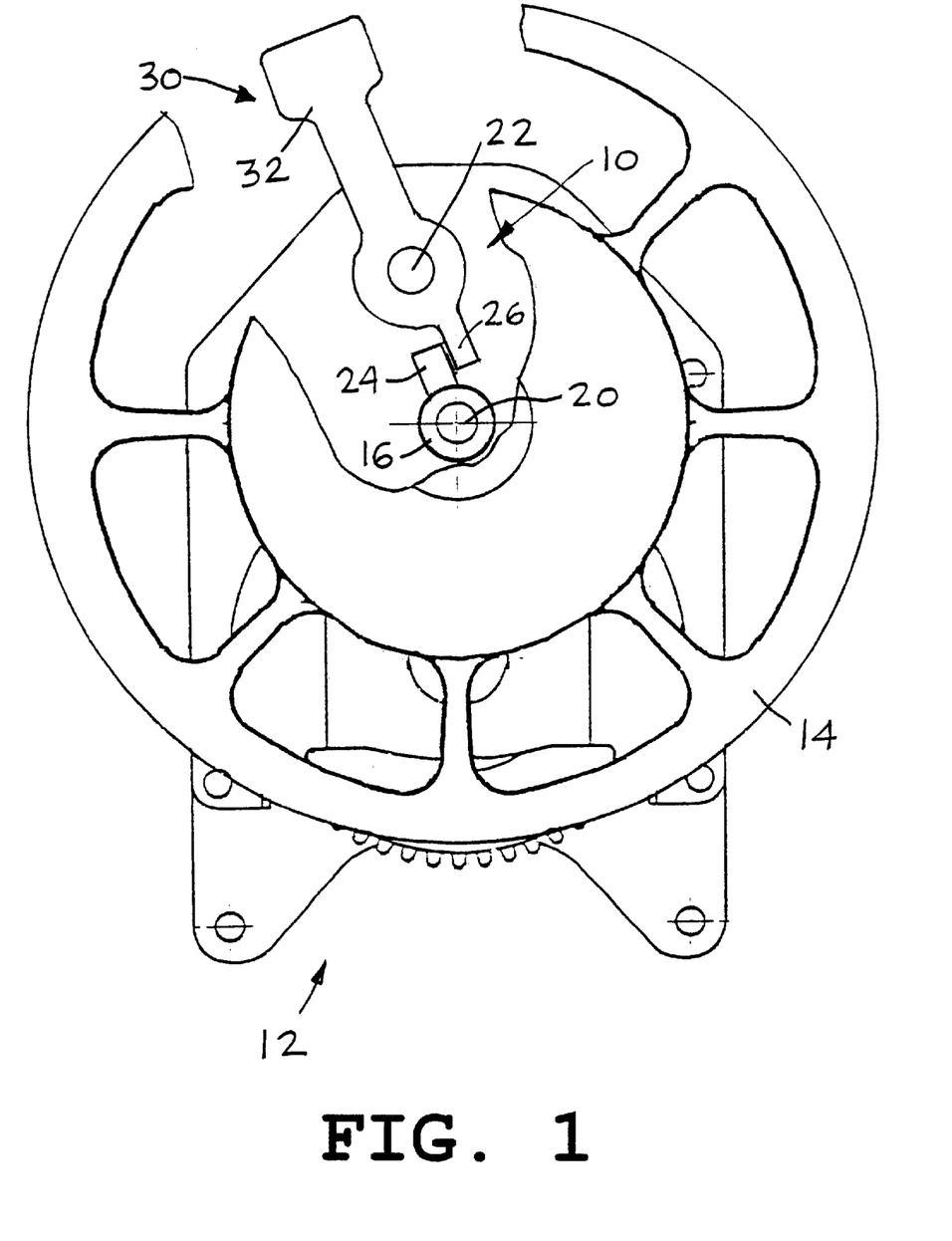
FIG. 1 is an elevation view of the present invention with a section removed to reveal the features of the present invention.

Now refer more particularly to FIG. 1 of the drawings. Illustrated therein is an apparatus, generally designated 10, for operating a railway car hand brake, generally designated 12. The apparatus 10 comprises a hand brake wheel 14, having a hub 16 fixed on an operating shaft 20. The operating shaft 20 is rotatably mounted on the hand brake 12. The hub 16 of the hand brake wheel 14 further has a reaction member 24. Preferably, the reaction member 24 is a lug of a predetermined size and shape, disposed on the perimeter of the hub 16 of the hand brake wheel 14. A brake release mechanism, generally designated 30, is fixed on a brake release shaft 22. The brake release shaft 22 is rotatably mounted on the hand brake 12. The reaction member 24 is engageable with the brake release mechanism 30 when the hand brake wheel 14 is rotated. Preferably, the brake release mechanism 30 includes an activation means 26, fixed on the brake release mechanism 30 for engagement with the reaction member 24 when the hand brake wheel 14 is rotated. Preferably, the rotation direction of the hand brake wheel 14 to apply the hand brake 12 is clockwise. Preferably, the activation means 26 is a trigger lever of a predetermined size and shape. Also preferred is that the brake release mechanism 30 further include a quick release lever 32. The position of the brake release mechanism 30 will provide a visual indicator of the brake status.

Figure 2:
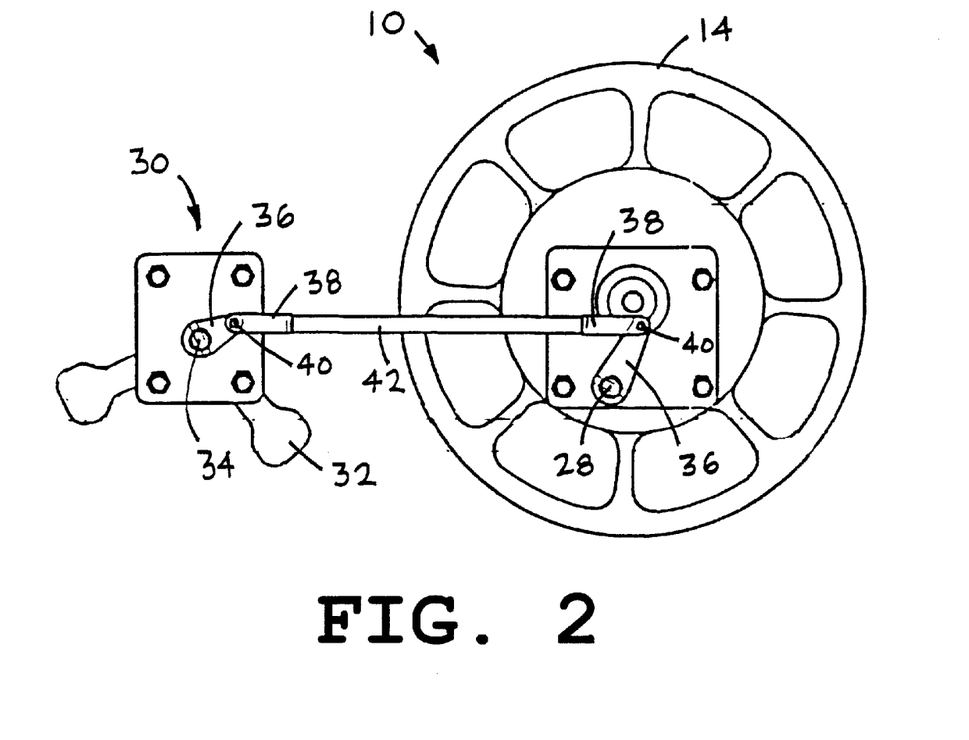
FIG. 2 is an elevation view of an alternative embodiment of the present invention.
Figure 3:
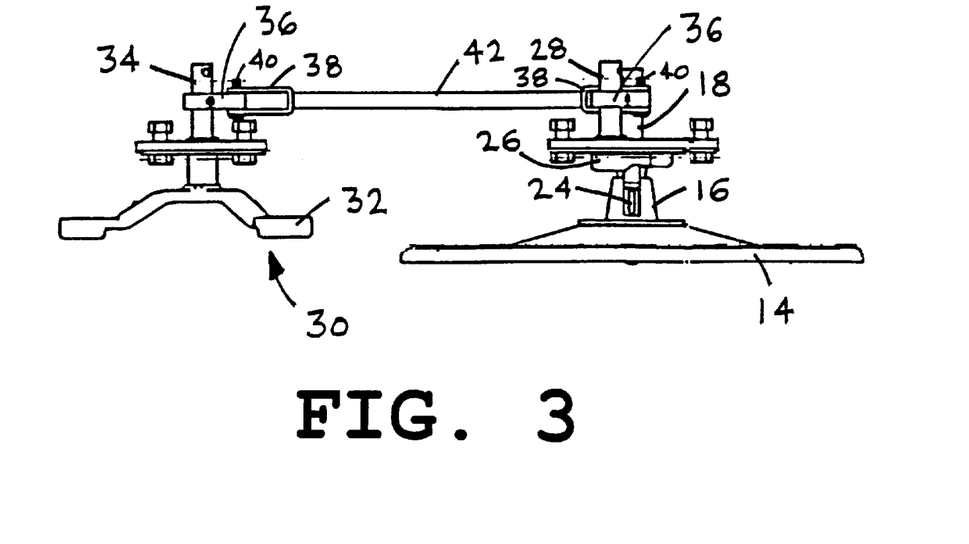
FIG. 3 is a top view of an alternative embodiment of the present invention.

Now refer more particularly to FIGS. 2 and 3 of the drawings. Illustrated therein, is an apparatus, generally designated 10, for remotely operating a railcar vertical wheel hand brake (not shown) a predetermined distance from the hand a brake. The apparatus 10 comprises a hand brake wheel 14, located a predetermined distance from the hand brake. The hand brake wheel 14 has a hub 16, fixed on a first shaft 18. The first shaft 18 is engageable with an operating shaft (not shown) rotatably mounted on the hand brake. The hub 16 of the hand brake wheel 14 further includes a reaction member 24. Preferably, the reaction member 24 is a lug disposed on the perimeter of the hub 16 of the hand brake wheel 14.

An activation means 26 is fixed on a second shaft 28, and the second shaft 28 is rotatably mounted a predetermined distance from the first shaft 18. The activation means 26 is engageable with the reaction member 24 when the hand brake wheel 14 is rotated, which rotates the second shaft 28 in an opposing direction to the rotation of the hand brake wheel 14. Preferably, the activation means 26 is a trigger lever of a predetermined size and shape. The second shaft 28 is engageable with a brake release shaft (not shown) rotatably mounted on the hand brake.

A brake release mechanism, generally designated 30, is fixed on a third shaft 34. Preferably, the brake release mechanism 30 further includes a quick release lever 32. The third shaft 34 is rotatably mounted a predetermined distance from the first shaft 18. The third shaft 34 is articulately connected to the second shaft 28 to rotate the third shaft 34 substantially in conjunction with the second shaft 28 when the hand brake wheel 14 is rotated. Preferably, levers 36, links 38, pins 40, and a rod 42 articulately connect the second shaft 28 and the third shaft 34. It is also preferred to rotate the hand brake wheel 14 in a clockwise direction to apply the hand brake. The hand brake can be remotely operated from a predetermined location on a railcar when the first shaft 18 is connected to the operating shaft of the hand brake.

Figure 5:
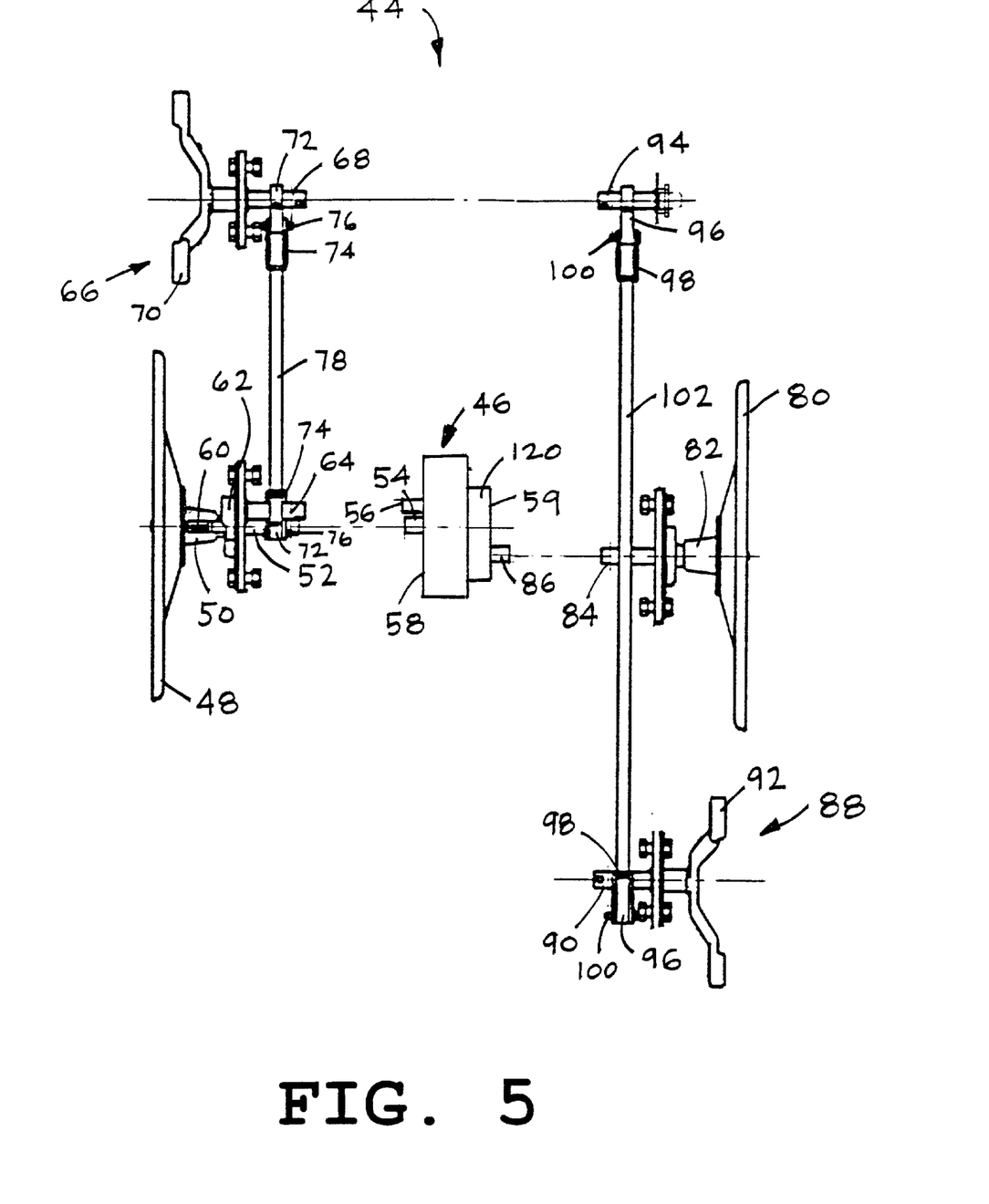
FIG. 5 is a top view of an alternative embodiment of the present invent.

Now refer more particularly to FIG. 5 of the drawings. Illustrated therein is an apparatus, generally designated 44, for remotely operating a railcar vertical wheel hand brake, generally designated 46, a predetermined distance from the hand brake 46. The apparatus 44 comprises a first hand brake wheel 48 located a predetermined distance from the hand brake. The first hand brake wheel 48 has a hub 50 fixed on a first shaft 52. The first shaft 52 is engageable with a first operating shaft 54 rotatably mounted on a first side 58 of the hand brake 46. The first hand brake wheel 48 has a reaction member 60. Preferably, the reaction member 60 is a lug disposed on the perimeter of the hub 50 of the first hand brake wheel 48.

An activation means 62 is fixed on a second shaft 64, which is rotatably mounted a predetermined distance from the first shaft 52. The activation means 62 is engageable with the reaction member 60 when the first hand brake wheel 48 is rotated. Preferably, the activation means 62 is a trigger lever of a predetermined size and shape. The second shaft 64 is rotated in an opposing direction to the rotation of the first hand brake wheel 48. The second shaft 64 is engageable with a brake release shaft 56 rotatably mounted on the hand brake 46.

A first brake release mechanism, generally designated 66, is fixed on a third shaft 68. Preferably, the first brake release mechanism 66 further includes a quick release lever 70.

The third shaft 68 is rotatably mounted a predetermined distance from the first shaft 52. The third shaft 68 is articulately connected to the second shaft 64. Preferably, levers 72, links 74, pins 76, and a rod 78 articulately connect the second shaft 64 to the third shaft 68.

A second hand brake wheel 80 is substantially opposed to the first hand brake wheel 48, and. is located a predetermined distance from the hand brake 46. The second hand brake wheel 80 has a hub 82 fixed on a fourth shaft 84. The fourth shaft 84 is engageable with a second operating shaft 86 rotatably mounted on a second side 59 of the hand brake 46.

A second brake release mechanism, generally designated 88, is fixed on a fifth shaft 90, which is rotatably mounted a predetermined from the fourth shaft 84. Preferably, the second brake release mechanism 88 further includes a quick release lever 92. A sixth shaft 94 is rotatably mounted and substantially opposed to the third shaft 68 of the first brake release mechanism 66. The sixth shaft 94 is engageable with the third shaft 68.

The fifth shaft 90 is articulately connected to the sixth shaft 94. Preferably, levers 96, links 98, pins 100, and a rod 102 articulately connect the fifth shaft 90 to the sixth shaft 94. The second shaft 64, third shaft 68, fifth shaft 90, and sixth shaft 94 will rotate substantially in conjunction when at least one of the first hand brake wheel 48 and the second hand brake wheel 80 is rotated. Preferably, the rotation direction of the first hand brake wheel 48 and the second hand brake wheel 80 is clockwise. The railcar hand brake 46 can be remotely operated from the opposing sides of the railcar when the first shaft 52 is connected to the first operating shaft 54, and the fourth shaft 84 is connected to the second operating shaft 86 of the hand brake 46.

Figure 4:
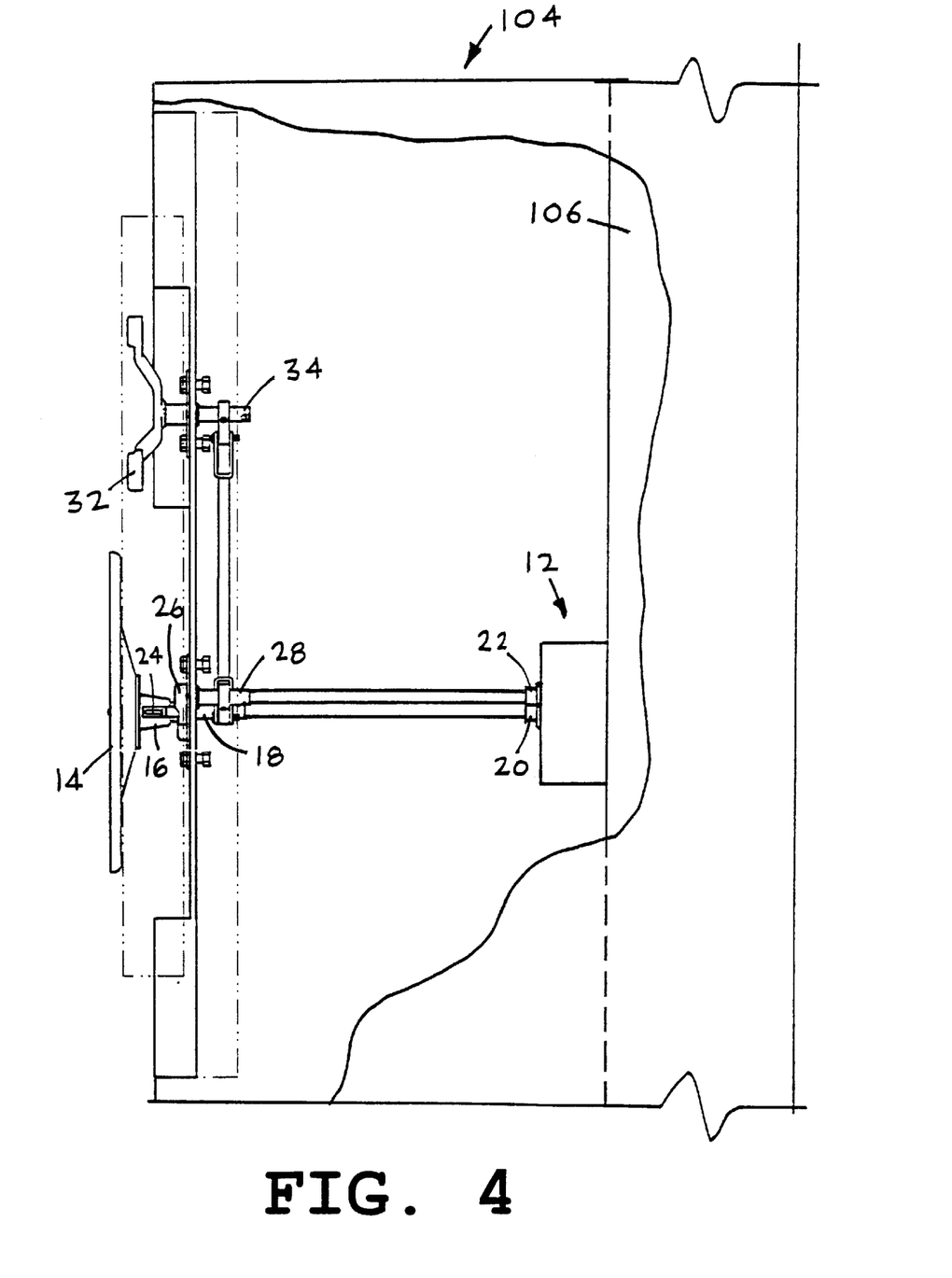
FIG. 4 is a top sectional view of an alternative embodiment of the present invention.

Now refer more particularly to FIGS. 2, 3 and 4 of the drawings. Illustrated therein is an improvement in combination with a railcar vertical hand brake, generally designated 12, having at least one operating shaft 20, and a brake release shaft 22. The hand brake 12 is mounted in a predetermined position on a railcar, generally designated 104. Preferably, the hand brake 12 is mounted on the center sill 106 of the railcar. The improvement comprises a hand brake wheel 14, located a predetermined distance from the hand brake 12. The hand brake wheel 14 has a hub 16, fixed on a first shaft 18. Preferably, the hand wheel 14 is mounted on a side of the railcar 104. The first shaft 18 is connected to the operating shaft 20 rotatably mounted on the hand brake 12. Preferably, an elongated member 108 of a predetermined length and shape connects the first shaft 18 to the operating shaft 20. The hand brake wheel 14 further includes a reaction member 24. Preferably, the reaction member 24 is a lug disposed on the perimeter of the hub 16 of the hand brake wheel 14. An activation means 26 is fixed on a second shaft 28, and the second shaft 28 is rotatably mounted a predetermined distance from the first shaft 18. The activation means 26 is engageable with the reaction member 24 when the hand brake wheel 14 is rotated, which rotates the second shaft 28 in an opposing direction to the rotation of the hand brake wheel 14. Preferably, the activation means 26 is a trigger lever of a predetermined size and shape. The second shaft 28 is connected to the brake release shaft 22 rotatably mounted on the hand brake 12. Preferably, a second elongated member 110 of a predetermined length and shape connects the second shaft 28 to the brake release shaft 22.

A brake release mechanism, generally designated 30, is fixed on a third shaft 34. Preferably, the brake release mechanism 30 further includes a quick release lever 32. The third shaft 34 is rotatably mounted a predetermined distance from the first shaft 18. The third shaft 34 is articulately connected to the second shaft 28 to rotate the third shaft 34 substantially in conjunction with the second shaft 28 when the hand brake wheel 14 is rotated. Preferably, levers 36, links 38, pins, 40, and a rod 42 articulately connect the second shaft 28 and the third shaft 34. It is also preferred to rotate the hand brake wheel 14 in a clockwise direction to apply the hand brake 12. The hand brake 12 can be remotely operated from a predetermined location on the railcar.

Figure 6:
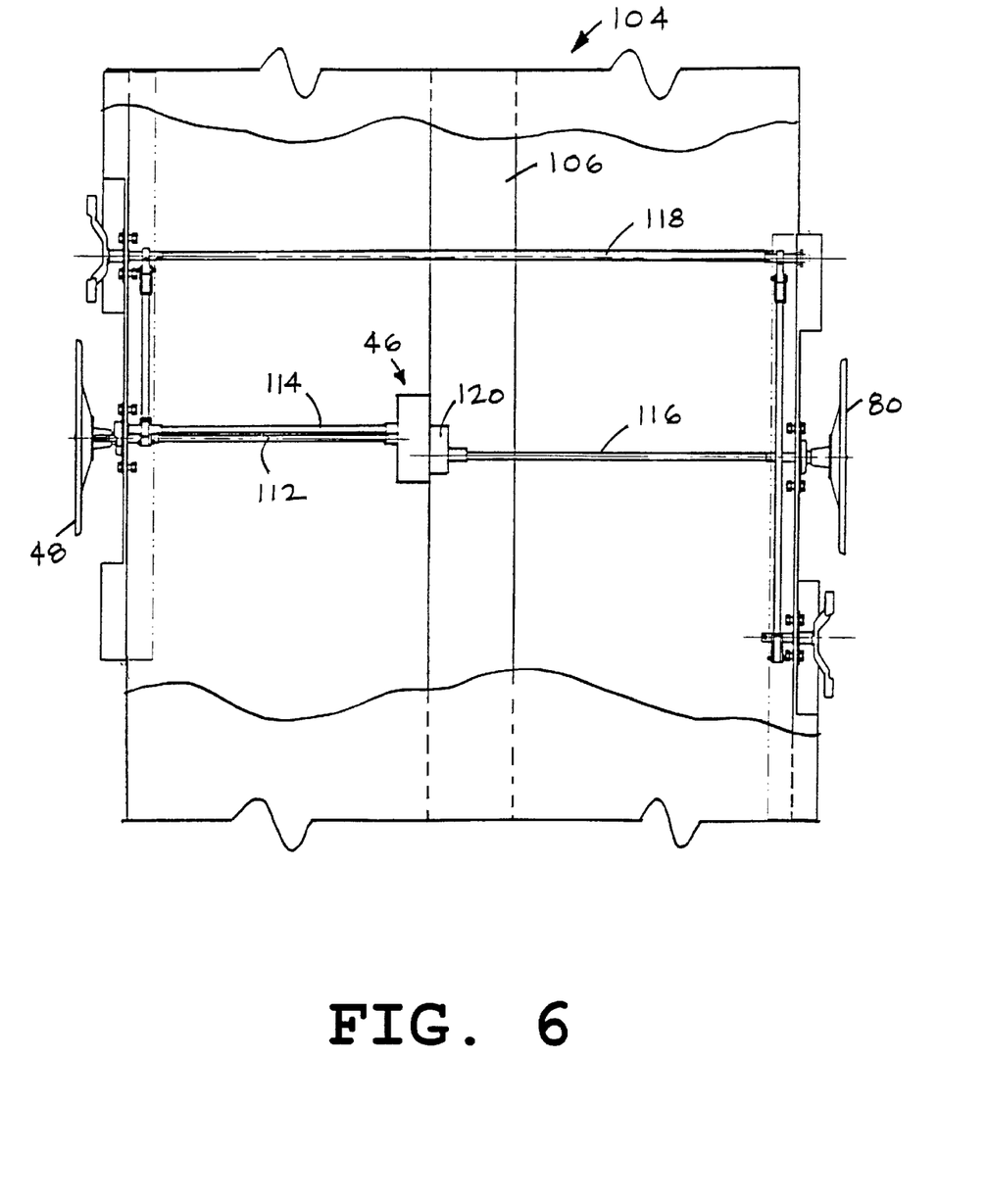
FIG. 6 is a top sectional view of another alternative embodiment of the present invention.

Now refer more particularly to FIGS. 5 and 6 of the drawings. Illustrated therein is an improvement in combination with a railcar vertical hand brake, generally designated 46, having a first operating shaft 54 rotatably mounted on the first side 58 of the hand brake 46, a second operating shaft 86 rotatably mounted on the second side 59 of the hand brake 46, and a brake release shaft 56 rotatably mounted on the first side 58 of the hand brake 46. The hand brake 46 is mounted in a predetermined position on a railcar, generally designated 104. Preferably, the hand brake 46 is mounted adjacent a center sill 106 of the railcar 104. A first hand brake wheel 48 is located a predetermined distance from the hand brake 46. Preferably, the first hand brake wheel 48 is mounted on a side of the railcar 104. The first hand brake wheel 48 has a hub 50 fixed on a first shaft 52. The first shaft 52 is connected to the first operating shaft 54. Preferably, an elongated member 112 of a predetermined length and shape connects the first shaft 52 to the first operating shaft 54. The first hand brake wheel 48 has a reaction member 60. Preferably, the reaction member 60 is a lug disposed on the perimeter of the hub 50 of the first hand brake wheel 48.

An activation means 62 is fixed on a second shaft 64, which is rotatably mounted a predetermined distance from the first shaft 52. The activation means 62 is engageable with the reaction member 60 when the first hand brake wheel 48 is rotated. Preferably, the activation means 62 is a trigger lever of a predetermined size and shape. The second shaft 64 is rotated in an opposing direction to the rotation of the first hand brake wheel 48. The second shaft 64 is connected to the brake release shaft 56. Preferably, a second elongated member 114 of a predetermined length and shape connects the second shaft 64 to the brake release shaft 56.

A first brake release mechanism, generally designated 66, is fixed on a third shaft 68. Preferably, the first brake release mechanism 66 further includes a quick release lever 70. The third shaft 68 is rotatably mounted a predetermined distance from the first shaft 52. The third shaft 68 is articulately connected to the second shaft 64. Preferably, levers 72, links 74, pins 76, and a rod 78 articulately connect the second shaft 64 to the third shaft 68.

A second hand brake wheel 80 is substantially opposed to the first hand brake wheel 48, and is located a predetermined distance from the hand brake 46. Preferably, the second hand brake wheel 80 is mounted on a side of the railcar 104. The second hand brake wheel 80 has a hub 82 fixed on a fourth shaft 84. The fourth shaft 84 is connected to the second operating shaft 86. Preferably, a third elongated member 116 of a predetermined length and shape connects the fourth shaft 84 to the second operating shaft 86.

A second brake release mechanism, generally designated 88, is fixed on a fifth shaft 90, which is rotatably mounted a predetermined distance from the fourth shaft 84. Preferably, the second brake release mechanism 88 further includes a quick release lever 92.

A sixth shaft 94 is rotatably mounted and substantially opposed to the third shaft 68 of the first brake release mechanism 66. Preferably, an elongated element 118 of a predetermined length and shape connects the sixth shaft 94 to the third shaft 68.

The fifth shaft 90 is articulately connected to the sixth shaft 94. Preferably, levers 96, links 98, pins 100, and a rod 102 articulately connect the fifth shaft 90 to the sixth shaft 94. The second shaft 64, third shaft 68, fifth shaft 90, and sixth shaft 94 will rotate substantially in conjunction when at least one of the first hand brake wheel 48 and the second hand brake wheel 80 is rotated. Preferably, the rotation direction of the first hand brake wheel 48 and the second hand brake wheel 80 is clockwise, therefore a gear box 120 is provided to compensate when the hand brake 46 is operated from the second side 59. The railcar hand brake 46 can be remotely operated, and the brake status can be determined, from the opposing sides of the railcar.

OPERATION

Now refer again to FIG. 1 of the drawings. When brake application is desired, the operator turns the hand brake wheel 14 in a clockwise direction. The reaction member 24 turns simultaneously and engages with the activation means 26 of the brake release mechanism 30. This engagement causes the brake release shaft 22 and the release lever 32 of the brake release mechanism 30 to rotate in a counterclockwise direction, whereby, with the assistance of gravity, the release lever 32 drops into the brake applied position. The winding gear (not shown) of the hand brake 12 is now re-engaged to permit brake application. When brake release is required, the release lever 32 of the quick release mechanism 30 is rotated clockwise into the release position. The position of the release lever 32 visually indicates that the hand brake 12 has been applied or released.

Now refer again to FIGS. 2, 3, and 4 of the drawings. When brake application is desired on a single remote hand brake operation, the operator turns the hand brake wheel 14 in a clockwise direction. When the first shaft 18 is connected to the operating shaft 20 of the hand brake 12, this action causes the operating shaft 20 to rotate, whereby brake application begins, while the reaction member 24 simultaneously rotates into and engages with the activation means 26. The activation means 26 and the second shaft 28 then rotate in the counterclockwise direction, which engages the winding gear (not shown) of the hand brake 12. The second shaft 28 is articulately connected to the third shaft 34, therefore the third shaft 34 rotates in conjunction. This counterclockwise rotation of the third shaft 34 causes the release lever 32 of the brake release mechanism 30 to rotate in the same counterclockwise direction. The release lever 32 drops into the applied position to indicate that the brakes are applied.

When brake release is required, the release lever 32 of the quick release mechanism 30 is rotated clockwise into the release position. This rotates the second shaft 28 clockwise, which synchronously rotates the attached brake release shaft 22, releasing the winding gear of the hand brake 12. The release lever 32 remains in this position as a positive visual indicator that the brakes are released.

Now refer again to FIGS. 5 and 6 of the drawings. When brake application is desired on a railcar with a remote hand brake operation on both sides of the car, the operator turns either the first hand brake wheel 48, or the second hand brake wheel 80 in a clockwise direction. The first hand brake wheel 48 is located on the side of the railcar facing the first side 58 of the hand brake 46 located adjacent the center sill, and the second hand brake wheel 80 is located on the opposite side, or facing the second side 59 of the hand brake 46 having the gear box 120.

If the first hand brake wheel 48 is rotated clockwise, the first shaft 52 connected to the first operating shaft 54 of the hand brake 46 causes the first operating shaft 54 to rotate, whereby brake application begins. The reaction member 60 simultaneously rotates into the activation means 62, rotating the second shaft 64 counterclockwise, which rotates the third shaft 68 counterclockwise because it is articulately connected to the second shaft 64. The brake release shaft 56 also rotates counterclockwise when the second shaft 64 is rotated. The release lever 70 of the first brake release mechanism 66 rotates counterclockwise and drops into the applied position, indicating brake application. The sixth shaft 94, connected to the third shaft 68, rotates counterclockwise. The fifth shaft 90, articulately connected to the sixth shaft 94, rotates clockwise, and causes the release lever 92 of the second brake release mechanism 88 to rotate clockwise and drop into the applied position, indicating brake application. Thus, the brake is remotely applied from the first side 58 of the hand brake 46, but brake application can be determined from either side of the car by visual observation of the release levers 70 and 92.

If the second hand brake wheel 80 is rotated clockwise, the fourth shaft 84 connected to the second operating shaft 86 of the hand brake 46 causes the second operating shaft 86 to rotate, whereby brake application begins. The gear box 120, to which the second operating shaft 86 is connected, corrects the, rotational direction to allow the second hand brake wheel 80 to be rotated in the same clockwise direction. As the first hand brake wheel 48 rotates in response to the rotation of the second hand brake wheel 80, the reaction member 60 rotates into and engages with the activation means 62. The activation means 62 rotates the second shaft 64 in a counterclockwise direction, causing the third shaft 68, which is articulately connected to the second shaft 64, to simultaneously rotate in the counterclockwise direction. The release lever 70 of the first brake release mechanism 66 rotates and drops into the applied position. The sixth shaft 94, located on the opposing side of the railcar and connected to the third shaft 68, rotates simultaneously, causing the articulately connected fifth shaft 90 to rotate clockwise and drop into the applied position. Thus, the brake is remotely applied from the second side 59 of the hand brake 46, but brake application can be determined from either side of the car by visual observation of the release levers 70 and 92.

Brake release is achieved in a similar manner by rotating one of the release levers 70 and 92 in a clockwise direction to disengage the winding gear of the hand brake 46. Thus, the brake is remotely released from either side of the railcar 104, and can also be determined from either side of the car by visual observation of the release levers 70 and 92.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. An apparatus for operating a railway car vertical wheel hand brake, said apparatus comprising:
   (a) a hand brake wheel, said hand brake wheel having a hub fixed on an operating shaft rotatably mounted on such hand brake, said hand brake wheel further having a reaction member;
   (b) a brake release mechanism fixed on a brake release shaft rotatably mounted on such hand brake, said reaction member engageable with said brake release mechanism when said hand brake wheel is rotated, whereby the position of said brake release mechanism will provide a visual indicator of the brake status.

2. The apparatus according to claim 1 wherein said reaction member is a lug of a predetermined size and shape disposed on the perimeter of said hub of said brake wheel.

3. The apparatus according to claim 1 wherein said brake release mechanism further includes an activation means fixed on said brake release mechanism for engagement with said reaction member when said hand brake wheel is rotated.

4. The apparatus according to claim 3 wherein said activation means is a trigger lever of a predetermined size and shape.

5. The apparatus according to claim 1 wherein the rotation direction of said hand brake wheel to apply such hand brake is clockwise.

6. An apparatus for remotely operating a railway car vertical wheel hand brake a predetermined distance from such railway car hand brake, said apparatus comprising:
   (a) a hand brake wheel located a predetermined distance from such hand brake, said hand brake wheel having a hub fixed on a first shaft, said first shaft engageable with an operating shaft rotatably mounted on such hand brake, said brake wheel further having a reaction member;
   (b) an activation means fixed on a second shaft, said second shaft rotatably mounted a predetermined distance from said first shaft, said activation means engageable with said reaction member when said hand brake wheel is rotated, rotating said second shaft in an opposing direction to the rotation of said hand brake wheel;
   (c) said second shaft engageable with a brake release shaft rotatably mounted on such hand brake; and
   (d) a brake release mechanism fixed on a third shaft rotatably mounted a predetermined distance from said first shaft, said third shaft articulately connected to said second shaft to rotate said third shaft in conjunction with said second shaft when said hand brake wheel is rotated; whereby such hand brake can be remotely operated, and the brake status can be determined from a predetermined location on such railway car when said first shaft is connected to such operating shaft of such hand brake, and said second shaft is connected to such quick release shaft of such hand brake.

7. The apparatus according to claim 6 wherein said reaction member is a lug disposed on the perimeter of said hub of said brake wheel.

8. The apparatus according to claim 6 wherein said activation means is a trigger lever of a predetermined size and shape.

9. The apparatus according to claim 6 wherein said second shaft and said third shaft are articulately connected by levers, links, pins, and a rod.

10. An apparatus for remotely operating a railway car vertical wheel hand brake a predetermined distance from such railway car hand brake, said apparatus comprising:
    (a) a first hand brake wheel located a predetermined distance from such hand brake, said first hand brake wheel having a hub fixed on a first shaft, said first shaft engageable with a first operating shaft rotatably mounted on a first side of such hand brake of such railway car, said first hand brake wheel further having a reaction member;
    (b) an activation means fixed on a second shaft, said second shaft rotatably mounted a predetermined distance from said first shaft, said activation means engageable with said reaction member when said hand brake wheel is rotated, rotating said second shaft in an opposing direction to the rotation of said first hand brake wheel;
    (c) said second shaft engageable with a brake release shaft rotatably mounted on such hand brake;

(d) a first brake release mechanism fixed on a third shaft, said third shaft rotatably mounted a predetermined distance from said first shaft, said third shaft articulately connected to said second shaft;

(e) a second hand brake wheel substantially opposed to said first hand brake wheel, and located a predetermined distance from such hand brake, said second hand brake wheel having a hub fixed on a fourth shaft, said fourth shaft engageable with a second operating shaft rotatably mounted on a second side of such hand brake;

(f) a second brake release mechanism fixed on a fifth shaft, said fifth shaft rotatably mounted a predetermined distance from said fourth shaft;

(g) a sixth shaft rotatably mounted and substantially opposed to said third shaft of said first brake release mechanism, said sixth shaft engageable with said third shaft; and (h) said fifth shaft articulately connected to said sixth shaft, whereby said second, third, fifth, and sixth shafts will rotate in conjunction when at least one of said first hand brake wheel and said second hand brake wheel is rotated, allowing such railcar hand brake to be remotely operated from such opposing sides of such railcar, and the brake status determined, when said first and fourth shafts are connected to such first and second operating shafts of such hand brake, and the second shaft is connected to such quick release shaft of such hand brake.

11. The apparatus according to claim 10 wherein said reaction member is a lug disposed on the perimeter of said hub of said first brake wheel.

12. The apparatus according to claim 10 wherein said activation means is a trigger lever of a predetermined size and shape.

13. The apparatus according to claim 10 wherein said first brake release mechanism and said second brake release mechanism further include a quick release lever.

14. The apparatus according to claim 10 wherein levers, links, pins, and a rod articulately connect said second shaft and said third shaft.

15. The apparatus according to claim 10 wherein levers, links, pins, and a rod articulately connect said fifth shaft and said sixth shaft.

16. In combination with a railway car hand brake having at least one operating shaft, said hand brake being mounted in a predetermined position on a railway car, the improvement comprising:

(a) a hand brake wheel having a hub fixed on a first shaft, said hand brake wheel mounted a predetermined distance from said hand brake, said first shaft connected to said operating shaft rotatably mounted on said hand brake, said brake wheel further having a reaction member;

(b) an activation means fixed on a second shaft, said second shaft rotatably mounted a predetermined distance from said first shaft, said activation means engageable with said reaction member when said hand brake wheel is rotated, rotating said second shaft in an opposing direction to the rotation of said hand brake wheel;

(c) said second shaft connected to a brake release shaft rotatably mounted on said hand brake; and (d) a brake release mechanism fixed on a third shaft, said third shaft rotatably mounted a predetermined distance from said first shaft, said third shaft articulately connected to said second shaft to rotate said third shaft in conjunction with said second shaft when said hand brake wheel is rotated; whereby said hand brake can be remotely operated from a predetermined location on such railway car, and the brake of status determined, when said first shaft is connected to said operating shaft of said hand brake, and said second shaft is connected to said brake release shaft of said hand brake.

17. The combination according to claim 16 wherein said hand brake is mounted on a center sill of such railcar.

18. In combination with a railway car hand brake having a first operating shaft rotatably mounted on a first side of said hand brake, and a second operating shaft rotatably mounted on a second side of said hand brake, said hand brake being mounted in a predetermined position on a railway car, the improvement comprising:

(a) a first hand brake wheel-having a hub fixed on a first shaft, said first hand brake wheel mounted a predetermined distance from said hand brake, said first shaft connected to said first operating shaft of said hand brake, said first hand brake wheel further having a reaction member;

(b) an activation means fixed on a second shaft, said second shaft rotatably mounted a predetermined distance from said first shaft, said activation means engageable with said reaction member when said first hand brake wheel is rotated, rotating said second shaft in an opposing direction to the rotation of said first hand brake wheel;

(c) said second shaft connected to a brake release shaft rotatably mounted on said first side of said hand brake;

(d) a first brake release mechanism fixed on a third shaft, said third shaft rotatably mounted a predetermined distance from said first shaft, said third shaft articulately connected to said second shaft;

(e) a second hand brake wheel substantially opposed to said first hand brake wheel having a hub fixed on a fourth shaft, said second hand brake wheel mounted a predetermined distance from said hand brake, said fourth shaft connected to said second operating shaft of said hand brake;

(f) a second brake release mechanism fixed on a fifth shaft, said fifth shaft rotatably mounted a predetermined distance from said fourth shaft;

(g) a sixth shaft rotatably mounted and substantially opposed to said third shaft of said first brake release mechanism, said sixth shaft connected to said third shaft; and (h) said fifth shaft articulately connected to said sixth shaft, whereby said second, third, fifth, and sixth shafts will rotate substantially in conjunction when at least one of said first hand brake wheel and second hand brake wheel is rotated, whereby said railcar hand brake can be remotely operated from such opposing sides of such railcar.

19. The combination according to claim 18 wherein said hand brake is mounted adjacent a center sill of such railcar.

20. The combination according to claim 18 wherein said second side of said hand brake further includes a gearbox.

* * * * *